US006750955B1

United States Patent
Feng

(10) Patent No.: US 6,750,955 B1
(45) Date of Patent: Jun. 15, 2004

(54) COMPACT OPTICAL FINGERPRINT SENSOR AND METHOD

(75) Inventor: Chen Feng, Bothell, WA (US)

(73) Assignee: IC Media Corporation, San Jose, CA (US)

(*) Notice: Subject to any disclaimer, the term of this patent is extended or adjusted under 35 U.S.C. 154(b) by 60 days.

(21) Appl. No.: 10/100,689

(22) Filed: Mar. 14, 2002

(51) Int. Cl.$^7$ ............................................. G06K 09/74
(52) U.S. Cl. .................... 356/71; 382/166; 382/127
(58) Field of Search ............... 356/71; 382/116, 382/127

(56) References Cited

U.S. PATENT DOCUMENTS 3,619,060 A * 11/1971 Johnson ........................ 356/71
5,650,842 A * 7/1997 Maase et al. ................. 356/71

* cited by examiner

Primary Examiner—Frank G. Font
Assistant Examiner—Roy M. Punnoose
(74) Attorney, Agent, or Firm—Fernandez and Associates, LLP

(57) ABSTRACT

For use in capturing a fingerprint image, an optical fingerprint sensor. In one embodiment of the present invention, the optical fingerprint sensor includes: (1) a light source on a PCB assembly, (2) a diffuser that receives light from the light source, (3) a right angle prism that receives light from the diffuser, (4) a collimating lens that receives light from the prism, (5) a first mirror that receives light from the collimating lens, (6) a second mirror that receives light from the first mirror, (7) a third mirror that receives light from the second mirror, (8) an imaging lens that receives light from the third mirror, and (9) an image sensor on the same PCB assembly as the light source that receives light from the imaging lens.

7 Claims, 7 Drawing Sheets

SECTION A-A

COMPACT OPTICAL FINGERPRINT SENSOR AND METHOD

BACKGROUND INFORMATION

1. Field of the Invention

The present invention is directed in general to fingerprint capture devices, and more specifically to optical fingerprint capture hardware systems.

2. Description of Related Art

Existing optical fingerprint sensors generally use a right angle prism to Capture the fingerprint image. The characteristic optical path in such sensors is illustrated in FIG. 1. Collimated light rays from a light source pass through one side of the prism. These light rays then travels to the top of the prism where a finger is placed. If a light ray impinges on a location where the finger is not in direct contact with the top of the prism, the light ray undergoes total internal reflection, and emerges through the other side of the prism where it is captured by an imaging sensor that is oriented perpendicular to the light ray. Alternatively, if the light ray impinges on a location where the finger is in direct contact with the top of the prism, the light ray does not undergo total internal reflection but is instead absorbed by the skin. Thus, the optical fingerprint sensor captures a pattern of light and dark bands representing the fingerprint.

As a consequence of the characteristic optical path described above, existing optical fingerprint sensors have the following drawbacks: (1) the sensor module has a large volume thereby limiting the range of commercial applications, (2) the non-planar orientation of the light source and the imaging sensor increases the cost to manufacture the sensor module and also limits commercial applications, and (3) the fingerprint image captured by the image sensor is compressed along one direction by a factor that is an irrational number (the square root of two) necessitating software correction of the fingerprint image which increases the cost to manufacture the sensor module and further limits commercial applications.

U.S. Pat. Nos. 5,892,599 and 5,629,764 added a holographic phase grating to the prism so that the image capture plane is normal to the optical axis of the imaging lens in order to remove the image distortion. U.S. Pat. No. 6,240,200 added a series of prisms as an alternative means to remove the image distortion. The problem with these approaches is that they necessitate a bulky and expensive sensor module.

U.S. Pat. No. 5,796,858 used a grating to replace the prism. The problem with this approach is that the fingerprint image quality suffers due to the optical imperfections of the grating.

Accordingly, there is a need for an optical fingerprint sensor that reduces the size and cost of the sensor module while ensuring a high quality of the fingerprint image.

SUMMARY OF THE INVENTION

The present invention provides for an optical fingerprint sensor. The fingerprint sensor includes a light source on a PCB; a diffuser that receives light from the light source; a right angle prism that receives light from the diffuser; a collimating lens that receives light from the prism; a first mirror that receives light from the collimating lens; a second mirror that receives light from the first mirror; a third mirror that receives light from the second mirror; an imaging lens that receives light from the third mirror; and an imaging sensor on the same PCB as the light source that receives light from the imaging lens.

Advantageously, the present invention minimizes the volume of the sensor module, enhances the manufacturability of the sensor module, and ensures a high quality of the fingerprint image.

Other structures and methods are disclosed in the detailed description below. This summary does not purport to define the invention. The invention is defined by the claims.

DETAILED DESCRIPTION

Figure 1:
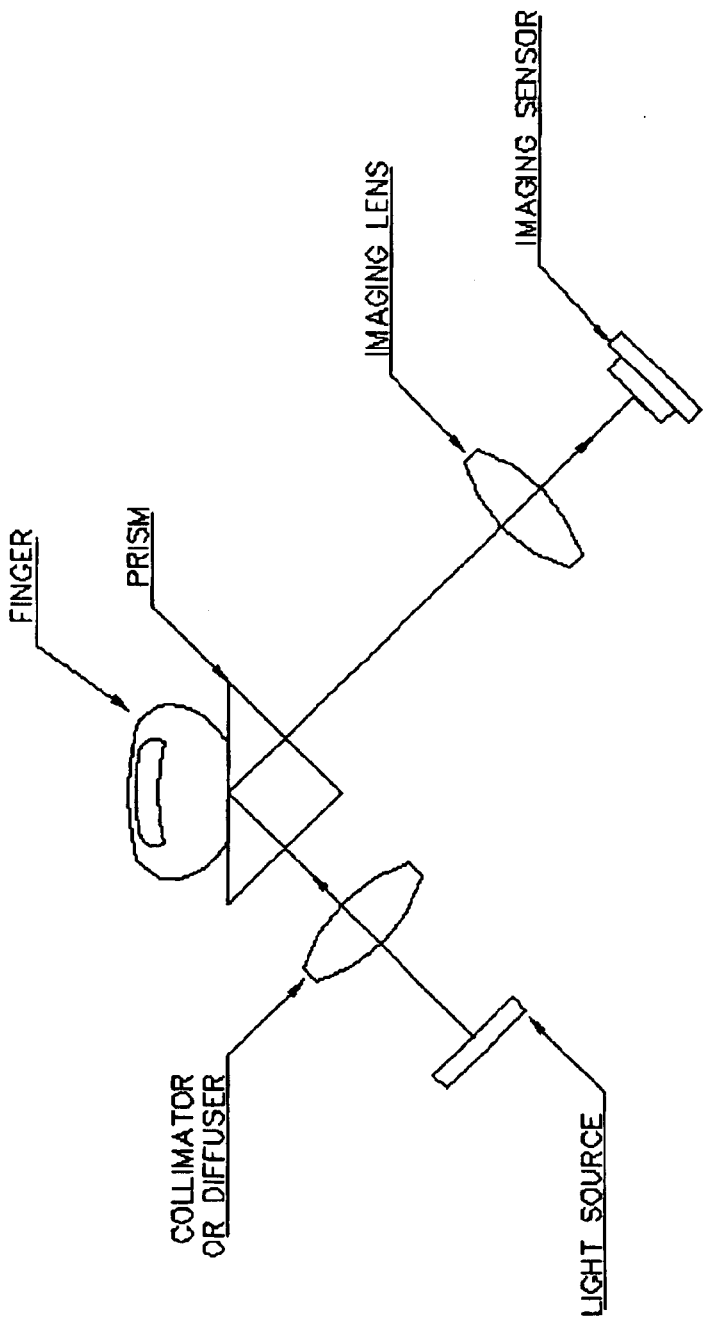
FIG. 1 illustrates an optical path diagram that is characteristic of prior art related to the present invention.
Figure 2:
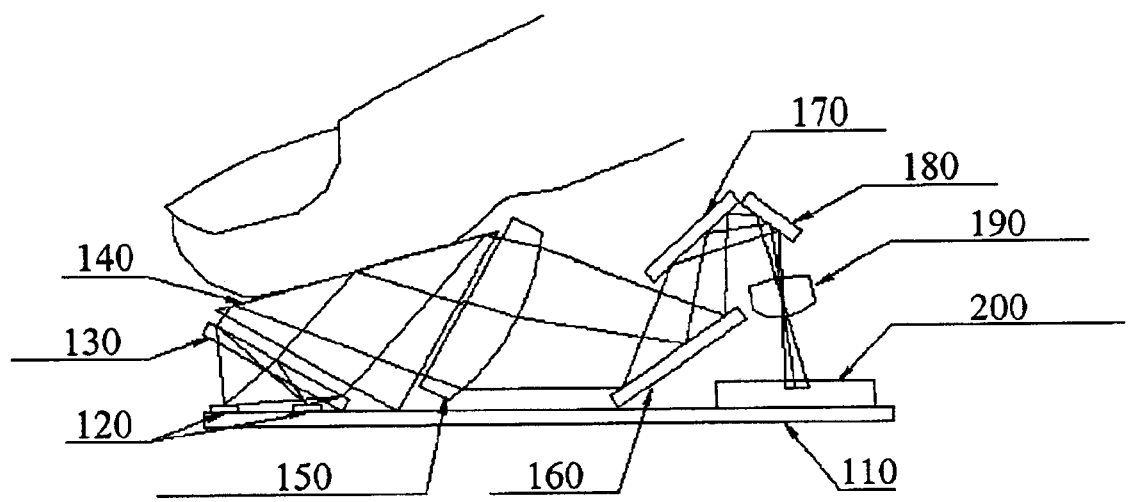
FIG. 2 illustrates an optical path diagram for an optical fingerprint sensor in accordance with the present invention.

FIG. 2 illustrates the optical path through the components of an optical fingerprint sensor 100 in accordance with the present invention. In the preferred embodiment of the present invention, the components comprise a PCB assembly 110, a light source 120, a diffuser 130, a right angle prism 140, a collimating lens 150, a first mirror 160, a second mirror 170, a third mirror 180, an imaging lens 190, and an image sensor 200.

Light rays are emitted from a light source 120 located on the PCB assembly 110 comprising, for example, a number of LEDs.

The light rays then impinge upon a diffuser 130 that changes the direction of the light rays to create a uniform illumination of the right angle prism 140. The diffuser 130 receives the plurality of light rays and collimates the plurality of light rays to the prism 140.

The light rays entering the right angle prism 140 then impinge upon the upper surface of the right angle prism 140 where a finger is placed. In the preferred embodiment of the present invention, it is ergonomically beneficial for the upper surface of the right angle prism 140 be inclined at 15 degrees.

The light rays that impinge upon locations where the finger is not in direct contact with the upper surface of the right angle prism 140 undergo total internal reflection.

Upon exiting the right angle prism 140, the light rays impinge upon a collimating lens 150 that causes the exiting light rays to converge and compensate for keystone distortion of the fingerprint image.

The light rays exiting from the collimating lens 150 then reflect from a first mirror 160, a second mirror 170, and a third mirror 180. The combined effect of these three mirrors is to fold the optical path into a small physical volume.

Furthermore, the optical path is folded so that the light source 120 and the image sensor 200 can be placed on the same PCB assembly 110. Those skilled in the art should understand that although the preferred embodiment of the present invention uses three mirrors, more or less mirrors could be used, without departing from the spirit of the present invention.

The light rays reflecting from the third mirror 180 then impinge upon an imaging lens 190, which comprises an aspheric lens that forms a high quality fingerprint image on the image sensor 200 located on the PCB assembly 10.

Figure 3:
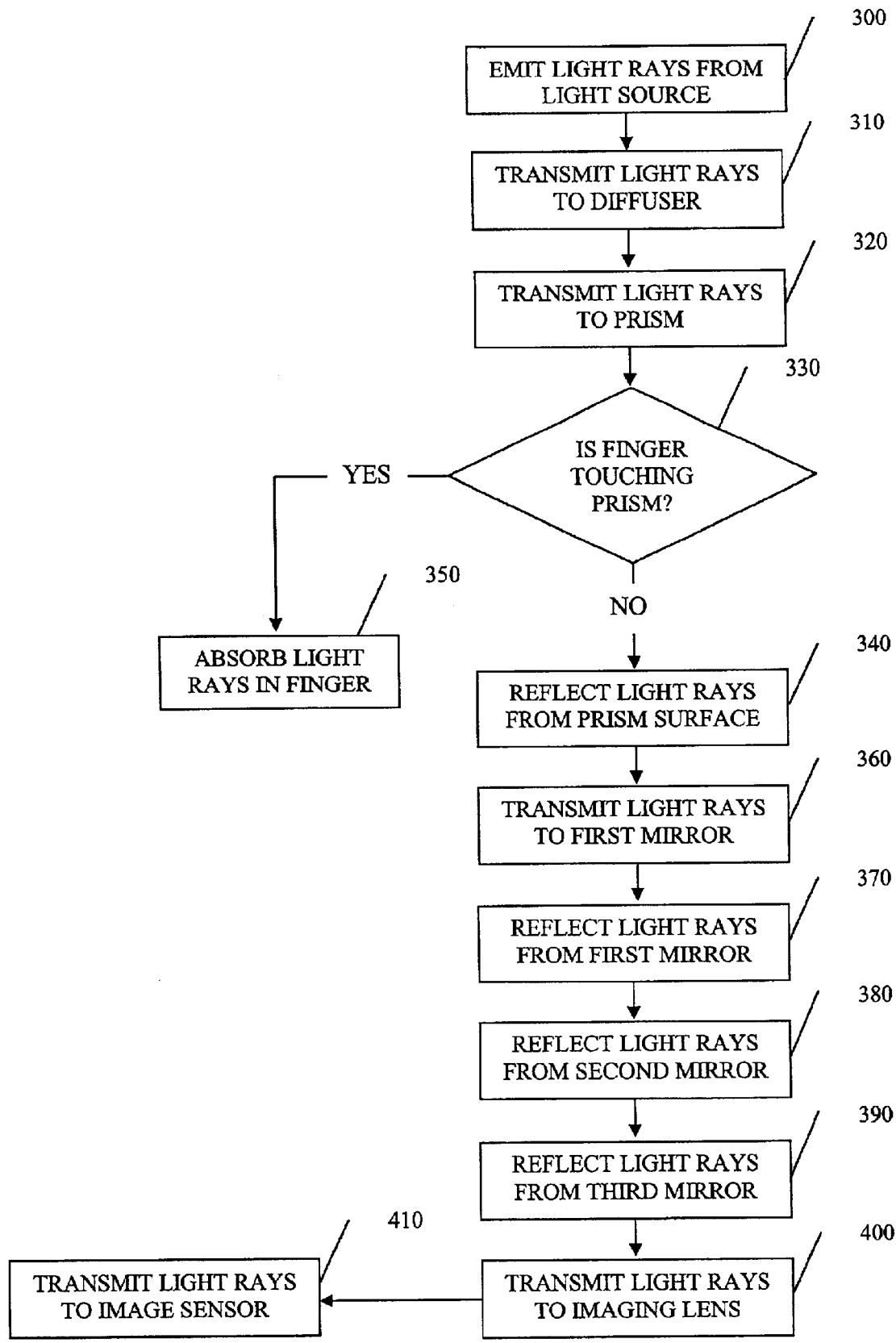
FIG. 3 illustrates a flow diagram of a method for capturing a fingerprint image in accordance with the present invention.
Figure 4A:
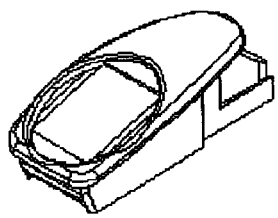
FIGS. 4A–4D illustrate a sensor module assembly for an optical fingerprint sensor in accordance with the present invention.
Figure 4C:
Figure 4B:
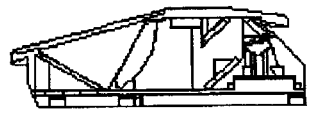
Figure 4D:
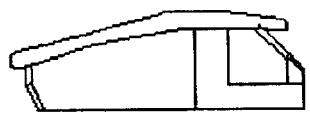

Turning now to FIG. 3, illustrated is a flow diagram of a method for capturing a fingerprint image in accordance with the present invention. Light rays are first emitted from the light source 120 of FIG. 2 in a step 300. The light rays then impinge on a diffuser 130 in a step 310. The light rays then impinge on a prism 140 in a step 320. In a decisional step 330, the lights rays that impinge the top surface of the prism 140 where a finger surface is present are reflected in a step 340, while other light rays are absorbed by the finger surface in a step 350. The surviving light rays then impinge on a collimating lens 150 in a step 360. The light rays are then reflected off a first mirror 160 in a step 370, a second mirror 170 in a step 380, and a third mirror 180 in a step 390. The light rays then impinge on an imaging lens 190 in a step 400. Finally, the light rays then fall on an image sensor 200 in a step 410.

In the preferred embodiment of the present invention, the image sensor 200 is a single chip that performs all sensor control, in addition to image capture, processing, encoding and transmission. The fingerprint image captured on the image sensor 200 has a perspective distortion of 1 to 2 that can be eliminated in the image capturing circuit by, for example, down sampling the distorted fingerprint image in one direction by 1 pixel for every 2 pixels in the distorted fingerprint image.

In another embodiment of the present invention, the diffuser, prism and collimating lens are combined to reduce the number of components. For example, the diffuser can be formed on one side of the prism surface by means of a Fresnel pattern, while the collimating lens can be formed on the other side of the prism surface by means of a convex surface.

In another embodiment of the present invention, a lens surface or mirror surface is coated with a narrow band-pass filter to reduce ambient light entering the imaging path.

In another embodiment of the present invention, the three mirrors and imaging lens are combined into one customized prism comprising three facets coated with reflective films to form the mirrors, and one with convex curvature to form the imaging lens.

Figure 5:
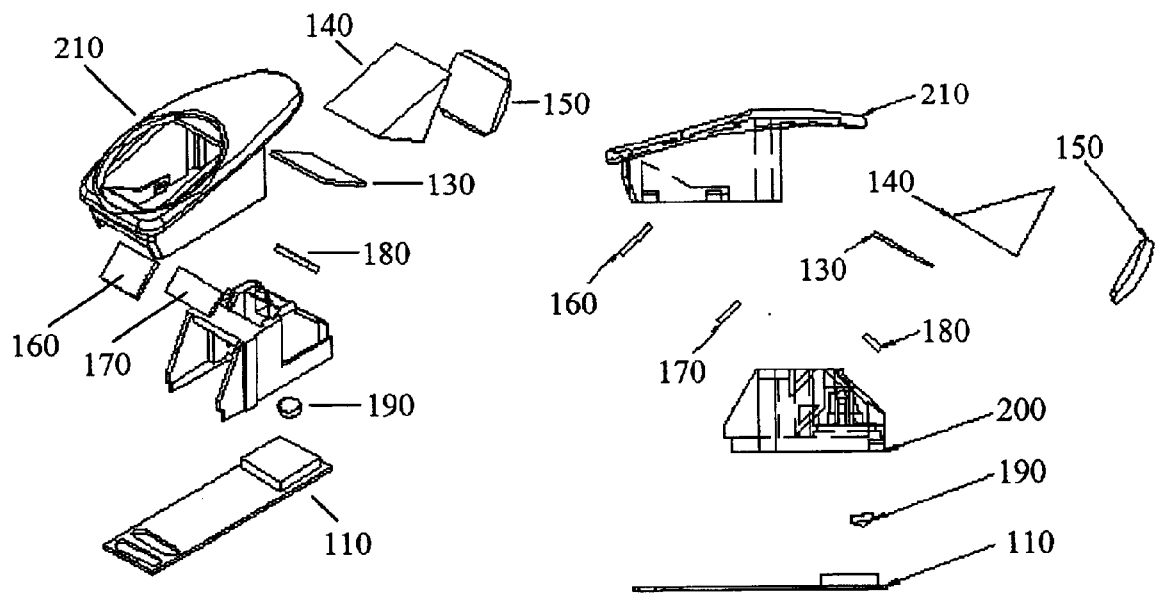
FIG. 5 illustrates an exploded sensor module assembly for an optical fingerprint sensor in accordance with the present invention.

FIGS. 4A–4D illustrate the sensor module assembly in the preferred embodiment of the present invention, while FIG. 5 illustrates an exploded view of the sensor module assembly. Advantageously, the frame-front 210 and the frame-back 200 are used to secure all the components into place without requiring any fasteners.

Figure 6A:
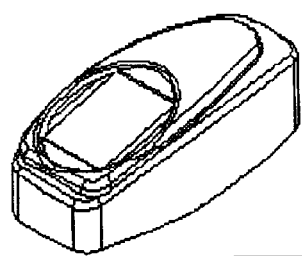
FIGS. 6A–6C illustrate a fingerprint reader containing an optical fingerprint sensor in accordance with the present invention.
Figure 6B:
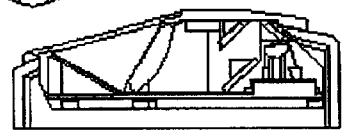
Figure 6C:
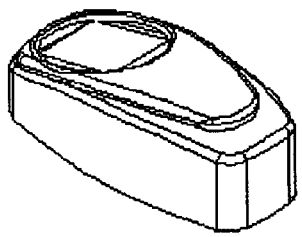

FIG. 6 illustrates a sensor module in accordance with the present invention in a configuration suitable for a stand-alone fingerprint reader.

Because of the compact nature of the sensor module, it can also be easily used as a sub-component enabling other devices to become fingerprint devices, including handheld devices, computer peripherals, and locks.

Figure 7:
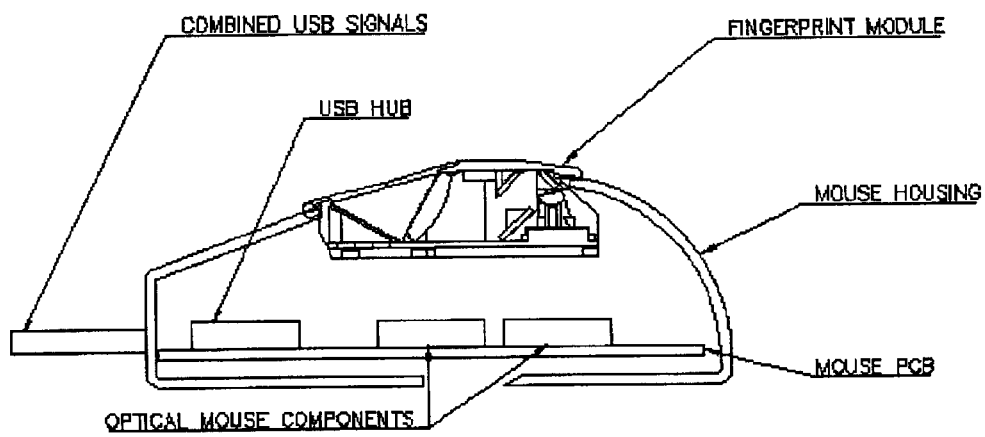
FIG. 7 illustrates a fingerprint optical mouse containing an optical fingerprint sensor in accordance with the present invention.

FIG. 7 illustrates a sensor module in accordance with the present invention embedded in an optical mouse. The signal from the optical mouse and the fingerprint image are combined into a single feed to enable various verification and authentication applications.

The present invention provides for an optical fingerprint sensor. The fingerprint sensor includes a light source on a PCB assembly; a diffuser that receives light from the light source; a right angle prism that receives light from the diffuser; a collimating lens that receives light from the prism; a first mirror that receives light from the collimating lens; a second mirror that receives light from the first mirror; a third mirror that receives light from the second mirror; an imaging lens that receives light from the third mirror; and an image sensor on the same PCB assembly as the light source that receives light from the imaging lens.

Although the present invention has been described in detail, those skilled in the art should understand that they can make various changes, substitutions, and alterations herein without departing from the spirit of the invention in its broadest form.

I claim:

1. An optical fingerprint sensor, comprising:
   a diffuser for receiving the plurality of light rays and collimating the plurality of light rays to the prism;
   a prism for receiving a plurality of light rays, the prism reflecting the light rays when a finger surface is in contact with the upper surface of the prism;
   a first mirror for receiving the light rays and for reflecting the plurality of light rays from the prism;
   a collimating lens, coupled between the prism and the first mirror, for receiving the plurality of light rays from the prism and for focusing the plurality of light rays to the first mirror;
   a second mirror for receiving the plurality of light rays from the first mirror and for reflecting the plurality of light rays; and
   an imaging lens for receiving the plurality of light rays from the second mirror and focusing the plurality of light rays onto a sensor.

2. The optical fingerprint sensor of claim 1, further comprising a third mirror, coupled between the second mirror and the imaging lens, for receiving the plurality of light rays form the second mirror and for reflecting the plurality of light rays to the imaging lens.

3. A method for imaging a fingerprint, comprising:
   receiving a plurality of light rays by a diffuser;
   reflecting the plurality of light rays at a top surface of a prism, comprising:
   if a finger surface is present at the top surface of the prism, absorbing the plurality of light rays by the finger that impinges the top surface of the prism; and
   if a finger surface is not present at the top surface of the prism, reflecting the plurality of light rays by the prism;
   collimating the plurality of light rays by a single lens;
   folding the plurality of light rays through one or more mirrors.

4. The method for imaging a fingerprint of claim 3, prior to the receiving step, further comprising emitting a plurality of light rays from a light source.

5. The method for imaging a fingerprint of claim 4 after the folding step, further comprising focusing the plurality of light rays through an imaging lens.

6. The method for imaging a fingerprint of claim 5 after the focusing step, further comprising detecting the plurality of light rays by a sensor.

7. An optical fingerprint sensor, comprising:

a diffuser for receiving and collimating light rays;

a prism for receiving the light rays from the diffuser, the prism reflecting the light rays when a finger surface is in contact with the upper surface of the prism;

a collimating lens for receiving the light rays from the prism and for focusing the light rays;

a first mirror for receiving the light rays from the prism and for reflecting the light rays;

a second mirror for receiving the light rays from the first mirror and for reflecting the light rays;

a third mirror for receiving the light rays form the second mirror and for reflecting the light rays; and an imaging lens for receiving the light rays from the third mirror and focusing the light rays onto a sensor.

* * * * *